UNITED STATES PATENT OFFICE.

JOHN J. BARDWELL, OF DETROIT, MICHIGAN.

PROCESS OF AUTOGRAPHIC PRINTING.

SPECIFICATION forming part of Letters Patent No. 223,873, dated January 27, 1880.

Application filed April 4, 1879.

*To all whom it may concern:*

Be it known that I, JOHN JEX BARDWELL, of Detroit, in the county of Wayne and State of Michigan, have invented an Improvement in Material and Process for Autographic Printing, of which the following is a specification.

The nature of my invention relates to novel and useful improvements in preparing suitable surfaces and in processes for printing directly from manuscript, without injury to the same, writing and pen-and-ink sketches and transfers.

By means of my improved process I am able to reproduce an indefinite number of copies of any manuscript work, written or prepared with an ordinary pen and ink, by printing in the usual printer's ink; or where it is desired to transfer to stone to be employed in lithographic printing or zincographic printing, the transfer-ink usually employed for the purpose is employed in taking the copies from the original manuscript, which are, by the use of such transfer-ink, transferred to prepared transfer-paper, from which they are transferred to the stone or zinc in the usual manner.

In order to give a proper understanding of my process, I will commence with the preparation of the ink which should be used with the pen in producing the original manuscript or pen-sketches. To any of the common writing-inks (and here I would state that I use the term "writing-inks" in contradistinction to those inks which are commonly denominated "copying-inks") there should be added about twelve (12) per cent. of sulphate of iron or its equivalents, for producing a chemical reaction, as hereinafter specified; or, if preferred, an ink may be made specially for the purpose, although the common inks in market will answer every purpose with the addition above named. With this ink and an ordinary pen the writing or sketches are made, preferably upon an uncalendered paper.

The next step in the process is to transfer this writing to a surface specially prepared to receive it in the following manner: Any suitable hard material with an even surface is provided with a thin coating of a compound made in the following proportions, substantially: To one pint of water add one-half ounce of gelatine and two drams of bichromate of potash. This should be dissolved by heat, and a thin coating applied to the surface of the slate, copper-plate, wood, card-board, or other hard surface, and exposed to daylight about one day. For a different class of work—like the printing of paper in strips or rolls—this coating may be applied to cloth or other suitable flexible material. After the surface thus made has been exposed a sufficient length of time to the action of the sun's rays, whether direct or diffused, another coating, forming the printing-base, is applied. This consists, substantially, of one ounce of gelatine or glue thoroughly dissolved in eight ounces of water, which should then be laid on evenly and left to dry, the quantity required being about two ounces of the solution to a square foot of surface.

As a difference in the quality of the gelatine or glue, or as atmospheric changes and conditions, may require, I may vary slightly the proportions herein described, and do not desire to be strictly confined to them; and circumstances may require an addition of certain proportions, as experience may dictate, of sulphate of copper, acetic acid, gum, alum, iron, or tannin, separately or in combination, for the purpose of hardening the film which forms the printing-surface. After this film or printing-surface is dried it is sensitized by immersion for a few moments, or about five minutes, in a solution of about one-half per cent. of bichromate potassium in water, and then surface-dried by blotting-paper or absorbent rollers. The sheet of paper upon which the manuscript has been written is then laid upon this film or printing-surface, face side down, and subjected to a slight pressure. The action of the ink upon the manuscript produces such a chemical change in the film or printing-surface wherever the ink-lines come in contact with it as to fit such points to receive ink from an ordinary printer's roller, such ink, containing oil, being repelled by all the remaining portions of the printing-surface or film so long as the same is kept slightly moist. Whenever this surface becomes dried it may be remoistened with a damp sponge as often as necessary without injury to the points which have been neutralized by the ink. This transfer, so to speak, does not injure the manuscript or deface it in the slightest degree, and it is then removed, and the printing of an indefinite number of copies is done upon ordinary paper, as above described.

The printing may be performed by vertical, scraping, or rolling motion, as may be most convenient.

Whenever, in large establishments, large numbers of these reproductions are desired, it is only necessary to take an impression or impressions from the printing-surface described on transfer-paper with transfer-ink, such as is usually employed for such purposes, preparatory to transferring the copy onto the stone or zinc in the usual manner.

I am aware of the patent granted May 19, 1874, to Ernest Edwards, and hereby disclaim the same.

What I claim as my invention is—

As an improvement in the art of autographic printing, the method described of producing the printing-surface for printing from, as usual, with printer's ink, which consists in, first, coating the support with a mixture of water, gelatine, and bichromate of potash; second, exposing such surface to the rays of the sun; third, applying a coating of dissolved gelatine; fourth, hardening such surface by drying or otherwise; fifth, sensitizing the same by immersing it in a solution of bichromate of potassium; and, sixth, transferring the printing-lines to the surface from paper sketched or written upon with ink containing sulphate of iron, substantially as set forth.

JOHN JEX BARDWELL.

Witnesses:
CHARLES J. HUNT,
H. S. SPRAGUE.